US010185033B2

(12) United States Patent
Justice et al.

(10) Patent No.: US 10,185,033 B2
(45) Date of Patent: Jan. 22, 2019

(54) ACTIVE CONTINUOUS AWARENESS SURVEILLANCE SYSTEM (ACASS): A MULTI-MODE 3D LIDAR FOR DIVERSE APPLICATIONS

(71) Applicants: James W Justice, Newport Beach, CA (US); Medhat Azzazy, Laguna Niguel, CA (US); Itzhak Sapir, Irvine, CA (US)

(72) Inventors: James W Justice, Newport Beach, CA (US); Medhat Azzazy, Laguna Niguel, CA (US); Itzhak Sapir, Irvine, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 540 days.

(21) Appl. No.: 14/926,561

(22) Filed: Oct. 29, 2015

(65) Prior Publication Data

US 2018/0081060 A1    Mar. 22, 2018

Related U.S. Application Data

(60) Provisional application No. 62/073,091, filed on Oct. 31, 2014.

(51) Int. Cl.
| | |
|---|---|
| G01C 3/08 | (2006.01) |
| G01S 17/89 | (2006.01) |
| G01S 17/10 | (2006.01) |
| G01S 7/481 | (2006.01) |
| G01S 17/42 | (2006.01) |

(52) U.S. Cl.
CPC ............ G01S 17/89 (2013.01); G01S 7/4817 (2013.01); G01S 17/10 (2013.01); G01S 17/42 (2013.01)

(58) Field of Classification Search
CPC combination set(s) only.
See application file for complete search history.

(56) References Cited

U.S. PATENT DOCUMENTS

| | | | | |
|---|---|---|---|---|
| 9,315,192 B1* | 4/2016 | Zhu | ....................... | B60W 30/18 |
| 2012/0170024 A1* | 7/2012 | Azzazy | ................ | G01J 3/0202 |
| | | | | 356/51 |
| 2016/0003946 A1* | 1/2016 | Gilliland | ................ | G01S 17/10 |
| | | | | 356/5.01 |

* cited by examiner

*Primary Examiner* — Samantha K Abraham
(74) *Attorney, Agent, or Firm* — W. Eric Boyd, Esq.

(57) ABSTRACT

The ACASS 3D LIDAR system operates in a fundamentally new manner combining features of flash LIDARS and scanning LIDARS simultaneously which enables mission and performance trades to be conducted by varying the sizes of illumination patches within the scenes being observed. Further the combination of these modes of operation into a single LIDAR system enables multiple modes of operation and multiple missions to be accomplished with single lasers obviating the need for multiple lasers and enabling significant simplification of beam control modes. Systems which result from the new, expanded size, weight, power, cost trade space enabled by the ACASS concept can provide new levels of performance at significantly reduced risks and costs The achievement of wide area, three dimensional imaging using a LIDAR sensor system is accomplished with one laser which operates using an eye safe fiber laser with very high puke 13 rates but very low energy per pulse.

8 Claims, 2 Drawing Sheets

ACASS Principle Features

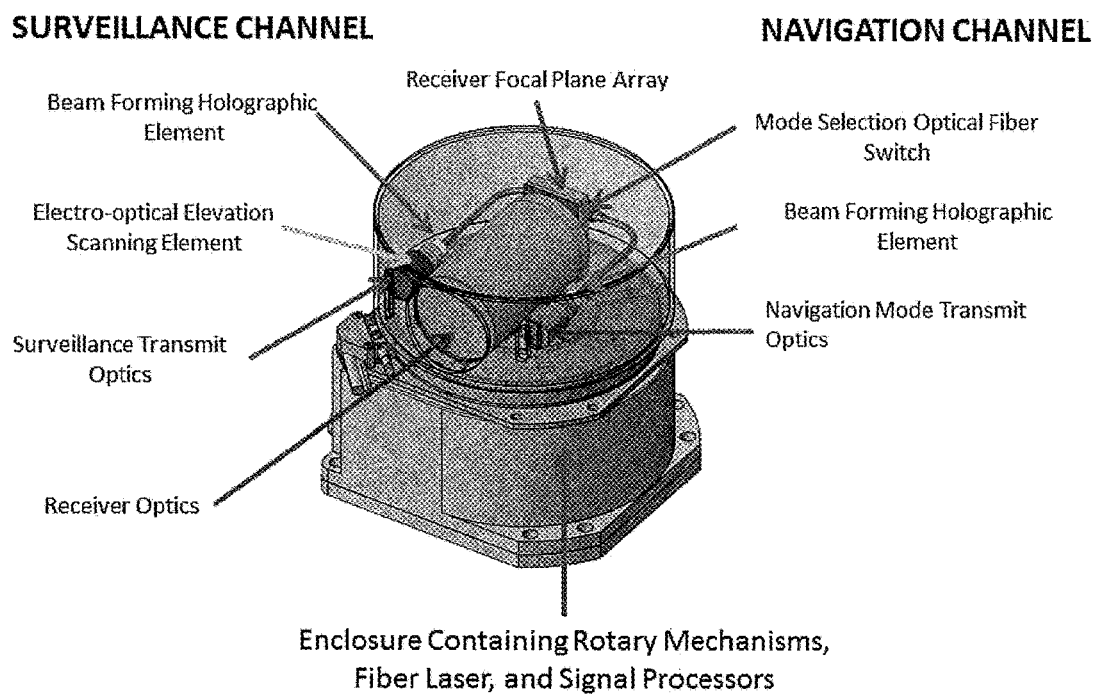
Figure 1: ACASS Principle Features

Figure 2: ACASS Design
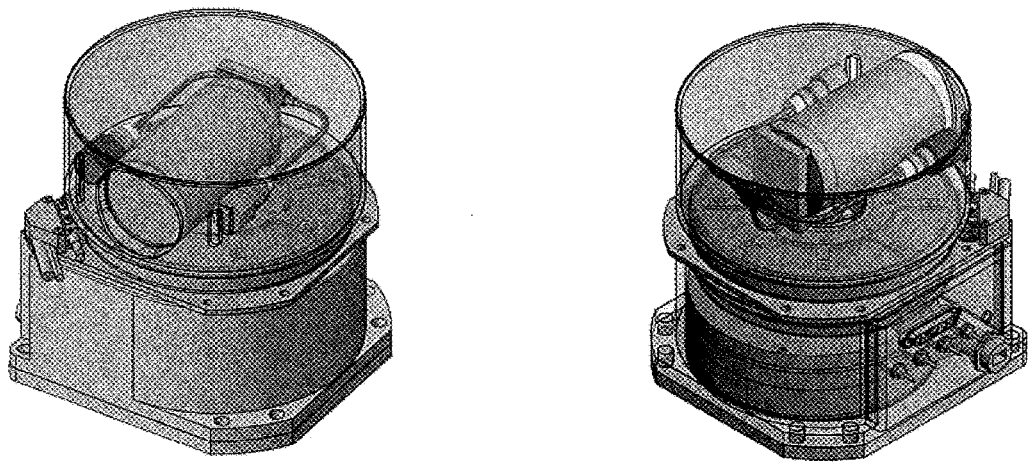
Figure 3: ACASS Design
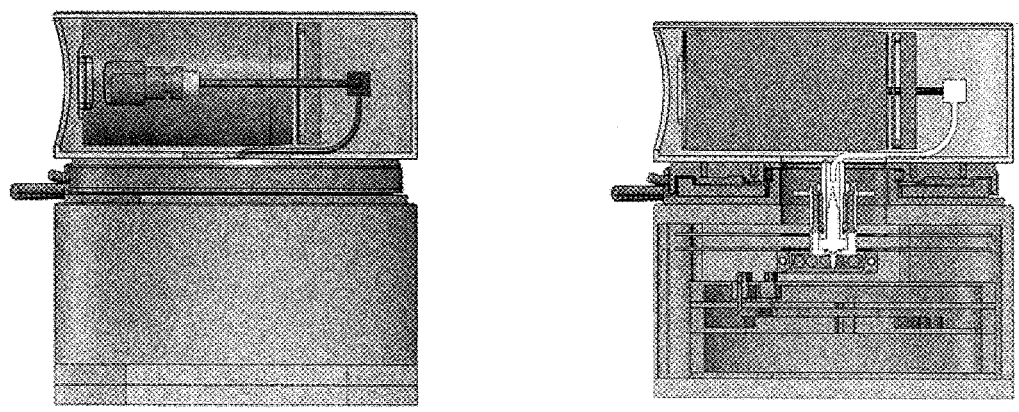

ACTIVE CONTINUOUS AWARENESS SURVEILLANCE SYSTEM (ACASS): A MULTI-MODE 3D LIDAR FOR DIVERSE APPLICATIONS

CROSS-REFERENCE TO RELATED APPLICATIONS

This application claims the benefit of U.S. Provisional Patent Application No. 62/073,091, filed on Oct. 31, 2014 entitled "Active Continuous Awareness Surveillance System (ACASS): a Multi-mode 3D LIDAR for Diverse Applications" pursuant to 35 USC 119, which application is incorporated fully herein by reference.

STATEMENT REGARDING FEDERALLY SPONSORED RESEARCH AND DEVELOPMENT

NA

BACKGROUND OF THE INVENTION

1. Field of the Invention

The invention relates generally to the field of Three Dimensional Imaging LIDARS. More specifically, the invention relates to a LIDAR assembly which can perform wide area 3D imaging for multiple applications.

2. Description of the Related Art

LIDAR systems produce image data in three dimensions due to their capability to measure the range to objects in scenes as well as the two dimensional spatial extent of objects in scenes. This is effected by scanning a narrow laser beam over the elements of the scene to be observed typically a very slow process. Larger scenes can be measured by such 3D LIDARS if multiple lasers or emitters are used in parallel. Mechanical mechanisms, typically cumbersome and typically requiring high power to operate, are used to point or scan the laser beams over even larger areas. Current systems produce high resolution 3D images but typically require significant times. These features of the current state of the art in 3D Imaging LIDARS when performing wide area imaging applications result in complex and costly systems. Lasers used in these applications typically operate at visible and near visible wavelengths. Such systems are rendered "eye safe" by rapidly scanning the beams in such a fashion that eye damage levels are not reached in the areas of operation. The eye safe feature fails if the scanning mechanisms stop and the laser energy is continuously deposited at the same small angles for longer periods of time.

What is needed is a 3D LIDAR system which operates in an eye safe mode under all the systems operating conditions, requires only one laser to achieve wide area 3 D imaging, and is mechanically simplified compared to current systems.

BRIEF SUMMARY OF THE INVENTION

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The ACASS 3D LIDAR system operates in a fundamentally new manner combining features of flash LIDARS and scanning LIDARS simultaneously which enables mission and performance trades to be conducted by varying the sizes of illumination patches within the scenes being observed. Further the combination of these modes of operation into a single LIDAR system enables multiple modes of operation and multiple missions to be accomplished with single lasers obviating the need for multiple lasers and enabling significant simplification of beam control modes. Systems which result from the new, expanded size, weight, power, cost trade space enabled by the ACASS concept can provide new levels of performance at significantly reduced risks and costs.

The achievement of wide area, three dimensional imaging using a LIDAR sensor system is accomplished with one laser which operates using an eye safe fiber laser with very high pulse rates but very low energy per pulse.

BRIEF DESCRIPTION OF THE SEVERAL VIEWS OF THE DRAWINGS

The invention and its various embodiments can now be better understood by turning to FIGS. 1, 2, and 3 and the description of the preferred embodiments which are presented as illustrated examples of the invention in any subsequent claims in any application claiming priority to this application. FIG. 1 identifies the principle physical features of the invention and their arrangement. FIGS. 2 and 3 present Solid Works renderings of the invention's design. It is expressly understood that the invention as defined by such claims may be broader than the illustrated embodiments described below.

DETAILED DESCRIPTION OF THE INVENTION

Turning now to the figures wherein like numerals define like elements among the several views, the ACASS 3D LIDAR system operates in a fundamentally new manner combining features of flash LIDARS and scanning LIDARS simultaneously which enables mission and performance trades to be conducted by varying the sizes of illumination patches within the scenes being observed. Further the combination of these modes of operation into a single LIDAR system enables multiple modes of operation and multiple missions to be accomplished with single lasers obviating the need for multiple lasers and enabling significant simplification of beam control modes. Systems which result from the new, expanded size, weight, power, cost trade space enabled by the ACASS concept can provide new levels of performance at significantly reduced risks and costs.

The ACASS 3D LIDAR system operates using an eye safe fiber laser with very high pulse rates but very low energy per pulse. The eye safe feature of this laser is inherent in its operating wavelength which is 1.54 microns in the SWIR spectral region. No human eye damage can occur even if the 3D LIDAR scanning mechanisms are not operating properly. The laser is mounted in a lower design element of ACASS which is illustrated in FIG. 1. This portion of the embodiment is fixed while the top portion of the embodiment rotates at various speeds that are determined by the application needs. For example, if the LIDAR is to be used for supporting autonomous vehicle navigation then rotation rates must be rapid enough to perform timely detection of close in objects typically at 5 Hz. If the LIDAR is to be used for long range wide area surveillance purposes, the LIDAR can rotate at much slower speeds typically 0.5 Hz.

An optical element integrated with the fiber laser's output fiber rotates the exiting beam at the rate of the upper enclosure's rotation speed. This allows the laser to be mounted in the stationary section and greatly reduces the weight and power required in the rotating section. This rotation/derotation element also accomplishes the transmission of power to the upper rotating chamber's components such as the focal plane array and transmission of data to the lower chamber's signal processing elements. The fiber laser outputs, when they reach the upper chamber, are directed into one of two transmission channels by an integrated optical switch. The first of these channels is designed to support vehicle navigation functions. The second of these channels is designed to support long range wide area 3D surveillance.

In the navigation channel, a holographic element is placed which shapes the outgoing beam into a 30 degree (elevation) beam with uniform illumination. This is described as a "top hat" image format. The outgoing beam covers 512 elevation spatial samples and one azimuth spatial sample. Thus elevation scanning is not required for this mode of operation. Azimuth scanning is accomplished by rotation of the upper chamber. The returns from scene elements are received by a focal plane array which matched the outgoing beam and consists of 512 InGaAs pin diodes in a linear array. Fast time samples of each of these detectors enable multiple objects to be detected and their ranges determined within each of the 512 pixels of the array. Rapid rotation of the top chamber of the ACASS LIDAR at a 5 Hz rate produces 3D imagery that can support autonomous navigation functions. Range measurements better than 10 cm can be obtained throughout the 360 azimuth by 30 degree elevation field of regard. The high resolution instantaneous field of view of each pixel is 1 milliradian which produced a high resolution spatial picture of the scene as the high resolution range data is being obtained. A receiver telescope is positioned in the center of the upper chamber to capture the returning photons reflected from the scene elements. These measurements are then transmitted to the signal processor in the lower chamber for display and exploitation by the system user.

In the surveillance channel, very long range detection range and high resolution imaging is of primary interest. The same fiber laser, focal plane array, receiver optics, signal processor, and azimuth rotation mechanisms can be used to operate the 3D LIDAR at ranges much longer that that achieved by the navigation mode if the outgoing transmitted beam is reduced in size to cover fewer pixels per shot thus increasing the amount of energy going in to each element of the scene. The outgoing beam in the surveillance mode, if reduced to cover a 16×1 pixel size per pulse, can extend the detection range from >100 meters for the navigation mode to >1000 meters for the wide area surveillance mode. This mode, unlike the navigation mode, will require an element to accomplish an elevation scan of the smaller beam to cover the desired elevation field of regard. Since reduced numbers of pixels are being illuminated by each pulse it will take more time to fully illuminate the 30 degree elevation and 360 degree azimuth field of regard. This is achieved by slowing the upper chamber rotation rate to 0.5 Hz.

The design, as illustrated in the attached FIGS. 1, 2, and 3, integrates these disparate modes and, by making maximum use of common elements achieves, a compact, highly flexible multimode 3D LIDAR system which operates in an eye safe manner in all modes. This embodiment of the ACASS 3D LIDAR system results in a basically cylindrical design with diameter of 190 mm (7.5 inches) and a height of 190 mm (7.5 inches).

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub combination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A multi-mode LIDAR sensor system comprising:
   a single laser disposed in a fixed lower element,
   a rotating top portion having an application-defined rotation rate,
   a single receiver telescope and an associated focal plane array and read out circuitry,
   an operating mode selection switch, a first transmit channel and a second transmit channel, the first and second transmit channels each comprising an optical element which shapes an outgoing beam of the laser, an optical switch configured to selectively direct the outgoing laser beam to either the first transmit channel or the second transmit channel, outgoing beam transmit optics, an outgoing beam elevation steering element, means for azimuth scanning of the outgoing beam comprising a rotating optical element configured to rotate the outgoing beam at the rate of the top portion's rotation speed, and; a signal processing element that computes a range and forms a three dimensional image of an illuminated scene from a point cloud return.

2. The multi-mode LIDAR sensor system of claim 1 wherein the laser operates in an eye-safe spectral region and is a high repetition rate fiber laser.

3. The multi-mode LIDAR sensor system of claim 1 wherein the receiver telescope comprises a wide field of view optical instrument that images one or more returned SWIR laser pulses on the focal plane array.

4. The multi-mode LIDAR sensor system of claim 1 wherein the receiver comprises a SWIR sensitive focal plane array with integrated electronics and associated processing elements which measures a time of flight of a transmitted pulse when a returned pulse is detected by the focal plane array.

5. The multi-mode LIDAR sensor system of claim 1 wherein the signal processing element is configured for computing a range to a scene that has returned the laser pulse to the receiver and to transform a point cloud image into a three dimensional wide area scene image.

6. The multi-mode LIDAR sensor system of claim 1 wherein the beam forming elements comprise optical devices that transform the shape of the beam when it leaves the laser into desired shapes to provide a selected illumination pattern covering a different number of pixels per pulse which is determined by a particular long range or short range mission to be accomplished.

7. The multi-mode LIDAR sensor system of claim 1 wherein the mode selection switch is configured to selectively direct the laser output pulses into two different channels in order to accomplish a short range, high frame rate mode and a long range, low frame rate mode.

8. The multi-mode LIDAR sensor system of claim 1 wherein the azimuth scanning means element comprises a platform providing a 360 degree azimuth rotation range for providing a variable azimuth frame rate for supporting one or more multiple missions.

* * * * *